(12) United States Patent
Gefflaut et al.

(10) Patent No.: US 10,192,067 B2
(45) Date of Patent: Jan. 29, 2019

(54) SELF-DESCRIBED SECURITY MODEL FOR RESOURCE ACCESS

(71) Applicant: Microsoft Technology Licensing, LLC, Redmond, WA (US)

(72) Inventors: Alain F. Gefflaut, Kirkland, WA (US); Andrew W. Harper, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 224 days.

(21) Appl. No.: 15/165,783

(22) Filed: May 26, 2016

(65) Prior Publication Data

US 2017/0344731 A1  Nov. 30, 2017

(51) Int. Cl.
| G06F 21/00 | (2013.01) |
| G06F 21/62 | (2013.01) |
| G06F 21/44 | (2013.01) |

(52) U.S. Cl.
CPC .......... *G06F 21/6218* (2013.01); *G06F 21/44* (2013.01)

(58) Field of Classification Search
CPC ....... G06F 21/31; G06F 21/6218; G06F 21/30
See application file for complete search history.

(56) References Cited

U.S. PATENT DOCUMENTS

| 7,591,003 B2 | 9/2009 | Focke et al. |
| 8,549,622 B2 | 10/2013 | Byrne et al. |
| 8,782,670 B2 | 7/2014 | Havemose |
| 8,800,050 B2 | 8/2014 | Ray |
| 2006/0015718 A1 | 1/2006 | Liu et al. |
| 2006/0259487 A1* | 11/2006 | Havens ................... G06F 21/51 |
| 2008/0271031 A1 | 10/2008 | Herington |
| 2010/0024036 A1* | 1/2010 | Morozov ................ G06F 21/53 |
| | | 726/26 |
| 2011/0154500 A1 | 6/2011 | Sahita et al. |
| 2012/0017213 A1 | 1/2012 | Hunt et al. |

(Continued)

FOREIGN PATENT DOCUMENTS

| EP | 2887607 A1 | 6/2015 |
| WO | 2012104063 A1 | 8/2012 |

OTHER PUBLICATIONS

Behrang, "A software level analysis of TrustZone OS and Trustlets in Samsung Galaxy Phone", Published on: Jun. 4, 2013 Available at: https://www.sensepost.com/blog/2013/a-software-level-analysis-of-trustzone-os-and-trustlets-in-samsung-galaxy-phone/.

(Continued)

*Primary Examiner* — Brandon S Hoffman
*Assistant Examiner* — Helai Salehi
(74) *Attorney, Agent, or Firm* — Arent Fox LLP (57) ABSTRACT

Various embodiments provide techniques and devices for implementing a self-described security model for sharing secure resources between secure applications. In some examples, a trustlet can include a self-described policy defining capabilities of the trustlet and/or membership in a scenario group managed by a signing authority. Further, the trustlet can include a code signature signed by the signing authority. Additionally, a proxy kernel can allow the trustlet to share application data with other trustlets in the scenario group based on the policy and the code signature without exposing the application data to compromised system software and/or unauthorized applications.

19 Claims, 7 Drawing Sheets

(56) References Cited

U.S. PATENT DOCUMENTS

2015/0348026 A1 12/2015 Roberts et al.
2016/0180080 A1* 6/2016 Heldt-Sheller ......... G06F 21/57
726/22

OTHER PUBLICATIONS

"Ledger Wallet", Retrieved on: Mar. 9, 2016 Available at: https://www.ledgerwallet.com/beta/trustlet.
Sandhu, et al., "Secure information sharing enabled by Trusted Computing and PEI models", In Proceedings of the ACM Symposium on Information, computer and communications security, Mar. 21, 2006, pp. 2-12.
U.S. Appl. No. 14/502,965, Probert, et al., "Protecting Application Secrets from Operating System Attacks", filed Sep. 30, 2014.

* cited by examiner

SELF-DESCRIBED SECURITY MODEL FOR RESOURCE ACCESS

BACKGROUND

Isolating execution of an application is one security practice utilized to protect application data from unauthorized access and to provide guarantees such as integrity and/or confidentiality of the data and code used by the application. Isolation often includes running the application in an environment providing a tightly controlled set of resources used by the application. However, effective isolation methods must also permit secured applications to share data without exposing the application data to external compromised system software and/or unauthorized applications. Some architectures require identifying the set of applications that can access the application data during development of the application. However, often developers of the application are not aware of every application that may require access to the application data, and/or the type of access to the application data individual applications will require. For instance, an application vendor may be unable to list not yet developed applications that will need to securely interface with an application developed by the application vendor. Furthermore, it is often burdensome and inefficient to update pre-existing applications and/or secure execution environments to allow trust relationships between pre-existing applications and new applications in a dynamic way.

SUMMARY

This disclosure describes systems and methods for implementing a self-described security model for sharing secure resources between secure applications running in a secure execution environment (e.g., trustlets). Such resources can include encryption/decryption keys, passwords, secrets, memory objects, synchronization objects (e.g., semaphores, mutex, events, waitable timers, etc.), and/or protected content and the like. Within the security model, a signer authority can admit an application to a scenario group, and sign the application binary with a digital certificate of the signer authority. As a result, the application will possess one or more access rights with respect to system resources associated with the scenario group. Further, the signer authority can grant one or more capabilities to access system resources to an application. In some instances, the one or more capabilities can specify access by the application to system level functionality (e.g., Direct Memory Access ("DMA")). In some instances, the secure execution environment can manage access to a scenario group and/or a capability based at least in part on verifying a signature of an application binary. Given that the secure applications execute within the secure execution environment, the secure applications and the resources of the scenario group are protected from an untrustworthy Operating System ("OS") kernel.

For example, a computing device configured with a self-described security model can manage an operating system execution environment and can manage a secure execution environment. The computing device can execute a plurality of trustlets including a first trustlet and a second trustlet within the secure execution environment, and the first trustlet and second trustlet can be associated with a scenario group managed by a signer authority. Further, the computing device can receive, from the first trustlet, a first request to create a secure object having an association to the scenario group, and can create the secure object in response to the first request. In addition, the computing device can receive, from the second trustlet, a second request to access the secure object, and the secure execution environment can determine that the second trustlet is a member of the scenario group, and can provide the second trustlet access to the secure object.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is set forth with reference to the accompanying figures. In the figures, the left-most digit of a reference number identifies the figure in which the reference number first appears. The use of the same reference numbers in different figures indicates similar or identical items or features.

DETAILED DESCRIPTION

The following detailed description generally relates to implementing a self-described security model for sharing secure resources between applications executing in a secure execution environment and describing capabilities for granting access to system resources. In various examples, techniques and architectures create a secure resource associated with a scenario group managed by a signer authority, and provide trustlets associated with the scenario group access to the secure resource. In some instances, the trustlets are executable in a secure execution environment separate from a normal execution environment such as Microsoft Windows™ OS or Linux™ OS. Further, an OS kernel of the normal execution environment cannot access application data belonging to trustlets executing within the secure execution environment, even though the trustlets can rely on the OS kernel for resource management (e.g., resource allocation, memory management, memory scheduling, CPU scheduling, thread creation, thread synchronization, etc.).

A trustlet can include a self-described policy that defines a membership of the trustlet in a scenario group and one or more capabilities of the trustlet. As described herein, trustlet policies allow multiple trustlets to form a trust relationship for sharing secure objects at compile time without the need for constant updates to an execution environment.

Additionally, the trustlet can include a code signature based at least in part on the code of the trustlet and a policy section associated with the code. Further, a signer authority that manages the scenario group can generate the code signature. By signing the code of the trustlet, the signing authority grants the capabilities and/or memberships set forth in the policy to the trustlet. Thus, the signing authority controls access to shared resources within the scenario group as a root authority of the scenario group. In some instances, a vendor that develops the trustlet can specify the policy, and the signer authority can vet the policy and signal approval of the policy by generating the code signature. Therefore, a vendor can develop a trustlet, and self-describe the memberships and/or capabilities of the trustlet via the policy.

Typically, user application code executes in user mode of a normal execution environment, while kernel code associated with the OS kernel executes in kernel mode of the normal execution environment. When a process executes in kernel mode, the process can execute any instruction and reference any virtual address. As such, application data can be accessed by a compromised or malicious OS kernel or any kernel mode process.

The secure execution environment can include a second kernel mode and a second user mode. A proxy kernel can run in the second kernel mode, and one or more trustlets can execute in the user mode of the secure execution environment as secure applications. In order to conceal the application data of a secure application, the proxy kernel can manage access to memory associated with the secure execution environment. For instance, the proxy kernel can utilize second-level page tables to control access by the OS kernel to a memory space associated with a secure application. In addition, the proxy kernel can access memory addresses that are reserved for the kernel.

Further, the proxy kernel can act as a transparent interface between secure applications and the OS kernel for the provision of OS services. In some examples, the proxy kernel can provide a subset of the OS kernel services. Therefore, if a system call corresponds to a service the proxy kernel provides, the proxy kernel can satisfy the request using logic contained in the proxy kernel. The proxy kernel can provide a subset of the kernel services to the secure applications in various examples.

Additionally, the secure execution environment can manage a capability database that stores capability information for individual signer authorities. For instance, the capability database can indicate one or more capabilities that a signer authority is permitted to grant to trustlets. Further, the proxy kernel can receive a system call from a trustlet signed by a signer authority. In response, the proxy kernel can determine whether the capability database indicates that the signer authority is permitted to grant the trustlet a capability to request the proxy kernel to execute the system call. In another instance, the capability database can indicate the signer authorities authorized to define a scenario group.

In some examples, a hypervisor can manage the normal execution environment and the secure execution environment. Further, the hypervisor can provide a virtual partition that includes the normal execution environment and the secure execution environment. In addition, the normal execution environment and the secure execution environment can utilize a guest physical address space of the virtual partition. In some examples, the hypervisor can include: Microsoft Hyper-V™, Citrix XENServer™, VMWare ESX™, etc. Further, one or more guest OSes can execute within the virtual partitions provided by the hypervisor. Guest OSes can include a Microsoft Windows™ OS, a Linux/BSD/UNIX OS, Apple® OS X™, etc. For instance, a Guest OS can execute within the normal execution environment.

In some examples, a hypervisor can provide a virtual trust level facility. Further, a proxy kernel can configure access rights protections within the virtual trust level facility. For instance, in an embodiment with two virtual trust levels, the proxy kernel can configure the virtual trust level facility to permit the higher virtual trust level to access memory addresses associated with the normal execution environment and memory addresses corresponding to the secure execution environment. Additionally, the proxy kernel can configure the virtual trust level facility to restrict the lower virtual trust level from accessing memory addresses associated with the secure execution environment. Further, the memory addresses associated with the secure execution environment can store data belonging to the proxy kernel and secure applications. In addition, processes executing within the normal execution environment are assigned to the lower virtual trust level. As such, data belonging to a secure application can be protected from the OS kernel, given that the OS kernel belongs to the lower virtual trust level and cannot access data belonging to the higher virtual trust level.

Various examples are described further with reference to FIGS. 1-7.

EXAMPLE ENVIRONMENTS

Figure 1:
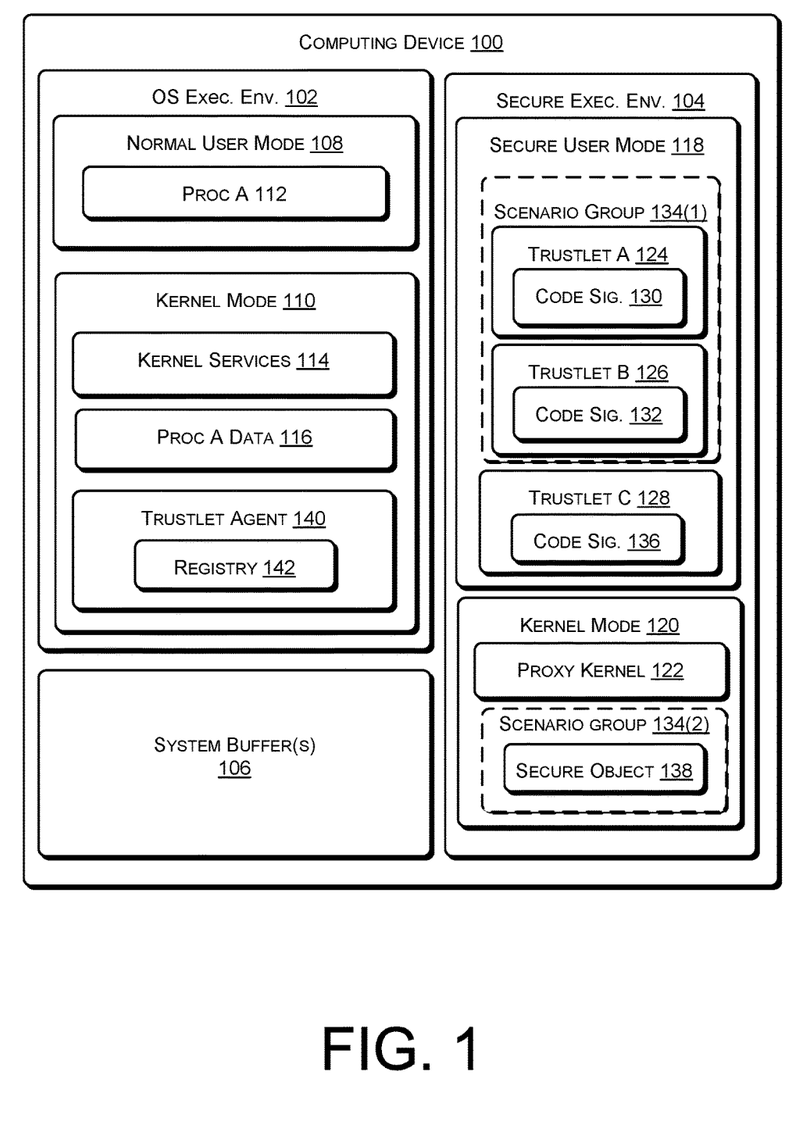
FIG. 1 is a block diagram depicting an environment for implementing a self-described security model for sharing secure resources between secure applications, according to various examples.

FIG. 1 depicts an environment including a computing device 100 for implementing self-described security model for sharing secure resources between secure applications, according to various examples. In some examples, the various devices and/or components of computing device 100 include an OS execution environment 102 and a secure execution environment 104 that can communicate with one another via one or more shared system buffers 106.

The OS execution environment 102 can provide a framework for code execution and provide common services for applications. In some examples, the OS execution environment 102 can include a normal user mode 108 and a kernel mode 110. User applications such as a process 112, which can be an unprivileged process, can execute in the user mode 106, while OS components such as kernel services 114 can execute in the kernel mode 110.

Process 112 can request one or more kernel services 114 via a system call. In some examples, the system call can trigger the execution of privileged instructions, such as process creation or input/output operations. Further, kernel services 114 can manage process kernel data 116 related to the execution of process 112. In some examples, the process kernel data 116 can include data related to memory management (e.g., virtual address space, process handle table, etc.).

The secure execution environment 104 can provide an execution environment that protects user application secrets from kernel services 114, which can be untrustworthy kernel services. The secure execution environment 104 can include a secure user mode 118 and a kernel mode 120. In some examples, a proxy kernel 122 can execute in the kernel mode 120 of the secure execution environment 104. Further, a trustlet A 124, a trustlet B 126, and a trustlet C 128 can execute as secure applications/processes in the secure user mode 118 of the secure execution environment 104. As described herein, a trustlet can correspond to an application, a portion of an application, a process, an executable, or a class executing within the secure execution environment 104.

While executing within the secure execution environment 104, the trustlet A 124 can request a service from the kernel services 114 of the OS execution environment 102. For instance, while the trustlet A 124 executes, the kernel services 114 can provide the trustlet A 124 with a private virtual address space (i.e., a user space). However, the proxy kernel 122 can determine the memory access protections of the user space of the trustlet A 124. For example, the proxy kernel 122 can disable access by the kernel services 114 to the user space of the trustlet A 124. In some instances, the proxy kernel 122 can restrict access to guest physical addresses associated with the trustlet A 124 via a second level page table. Access protections can include execute, execute read, execute read-write, execute write-copy, execute read-write, no access, read only, read-write, write-copy, etc.

In some examples, the proxy kernel 122 can provide OS kernel services to trustlet A 124, trustlet B 126, and trustlet C 128. For instance, the proxy kernel 122 can satisfy a kernel service request issued by trustlet B 126 by relying on its own kernel logic. The kernel logic can include a subset of the system call API of the kernel services 114. In some examples, the proxy kernel 124 can provide cryptographic services to processes executing with the secure execution environment 104. For instance, the proxy kernel 122 can perform cryptographic methods on the code signature 130 to determine that the trustlet A 124 is signed by an authorized signer authority. In some examples, a trustlet, such as the trustlet A 124, cannot be loaded within the secure execution environment 104 without being signed by an authorized signer authority. Additionally, performing cryptographic services within the secure execution environment 104 can protect confidential cryptographic information from being exposed to potentially untrustworthy kernel services 114.

Additionally, or alternatively, the proxy kernel 122 can send a kernel service request to the kernel services 114 of the OS execution environment 102. For example, the trustlet B 126 can request a kernel service (e.g., resource allocation, memory management, memory scheduling, CPU scheduling, thread creation, thread synchronization, etc.) via a system call, and the proxy kernel 122 can marshal parameters associated with trustlet B's 126 system call to the kernel services 114. In some other examples, the proxy kernel 122 can copy the application data to a virtual address, and permit access by the kernel services 114 to the virtual address. For instance, the proxy kernel 122 can permit access by the kernel services 114 to guest physical addresses associated with the virtual address via a second level page table. Further, the proxy kernel 122 can place the application data in a memory location that the proxy kernel 122 has allocated to the trustlet B 126. As such, the proxy kernel 122 can operate transparently to the kernel services 114.

A common signer authority can sign trustlet A 124 and trustlet B 126 to generate code signature 130 and code signature 132, respectively. Further, the proxy kernel 122 can determine that trustlet A 124 and trustlet B 126 belong to a scenario group 134 managed by the common signer authority based at least in part on code signature 130 and code signature 132, respectively. For instance, the application code of trustlet A 124 can include an identifier of a scenario group in a resource section. Further, the signer authority can generate a signature of the application code that includes the resource section. Additionally, a different signer authority can sign trustlet C 128 to generate a code signature 136. Although illustrated as belonging to only one scenario group in FIG. 1, in other some instances the trustlet A 124, the trustlet B 126, and/or the trustlet C 128 can belong to a plurality of scenario groups.

Additionally, while executing within the secure execution environment 104, the trustlet A 124 can request that the proxy kernel 122 create a secure object 138 within the scenario group 134. In response, the proxy kernel 122 can verify that the trustlet A 124 is a member of the scenario group 134, create the secure object 138, and associate the secure object with scenario group 134. If the trustlet A 124 were not a member of the scenario group 134, the proxy kernel can deny the request. Further, the proxy kernel 122 can manage and control access to the secure object 138. For instance, the proxy kernel 122 can control access to the secure object 138 by determining the access protections of the memory (e.g., memory addresses, virtual address space, etc.) storing the secure object 138.

In some examples, the trustlet B 126 can send a request to the proxy kernel 122 for access to the secure object 138. In response, the proxy kernel 122 can determine whether the trustlet B 126 is a member of the scenario group 134 associated with the secure object 138. Further, the proxy kernel 122 can provide access to the secure object 138 based at least in part on determining that the trustlet B 126 is a member of the scenario group 134. For instance, the proxy kernel can verify that the trustlet B 126 is a member of the scenario group 134 based at least in part on a signer authority that generated code signature 132 is also associated with the scenario group 134.

Upon creation of the secure object 138, the trustlet A 124 can notify a trustlet agent 140 executing in the normal execution environment 102 of the creation of the secure object 138 of the scenario group 134. Additionally, or alternatively, the proxy kernel 122 can notify the trustlet agent 140 of the creation of the secure object 138 of the scenario group 134. Further, the trustlet agent 140 can notify trustlets associated with the scenario group 134 of the creation of the secure object 138. For example, the trustlet agent 140 may send a notification to the trustlet B 126 regarding the creation of the secure object 138. Further, one or more methods of inter-process communication, such as message passing, synchronization, shared memory pages, and remote procedure calls (RPC), can be used for communication between a trustlet, such as trustlet A 124 or trustlet B 126, and the trustlet agent 140.

As illustrated in FIG. 1, the trustlet agent 140 can maintain a registry 142 that includes mappings between individual trustlets and scenario groups. For instance, the registry 142 can indicate that the trustlet B 126 is a member of the scenario group 134. In some other instances, the registry 142 can indicate that the trustlet B 126 should be notified of particular actions within the scenario group 134. For example, the registry 142 can indicate that the trustlet B 126 should be notified of the creation of secure objects within the scenario group 134.

In some other examples, the trustlet C 128 can send a request to the proxy kernel 122 for access to the secure object 138. In response, the proxy kernel 122 can determine whether the trustlet C 128 is a member of the scenario group 134 associated with the secure object 138. Further, the proxy kernel 122 can deny access to the secure object 138 based at least in part on determining that the trustlet C 128 is not a member of the scenario group 134. Therefore, the proxy kernel 122 permits the trustlet A 124 and trustlet B 126 to share a resource, such as the secure object 138, while protecting the shared resource from other trustlets, such as trustlet C 128, executing within the secure execution environment 104.

Additionally, the proxy kernel 122 can disable access by the kernel services 114 to the secure object 138. For instance, the proxy kernel 122 can set the memory protections of the secure object 138 such that the kernel services 114 is unable to access memory associated with the secure object 138. Therefore, the proxy kernel permits the trustlet A 124 and trustlet B 126 to share a resource, such as the secure object 138, while protecting the shared resource from the potentially untrustworthy kernel services 114 of the normal execution environment 102.

Figure 2:
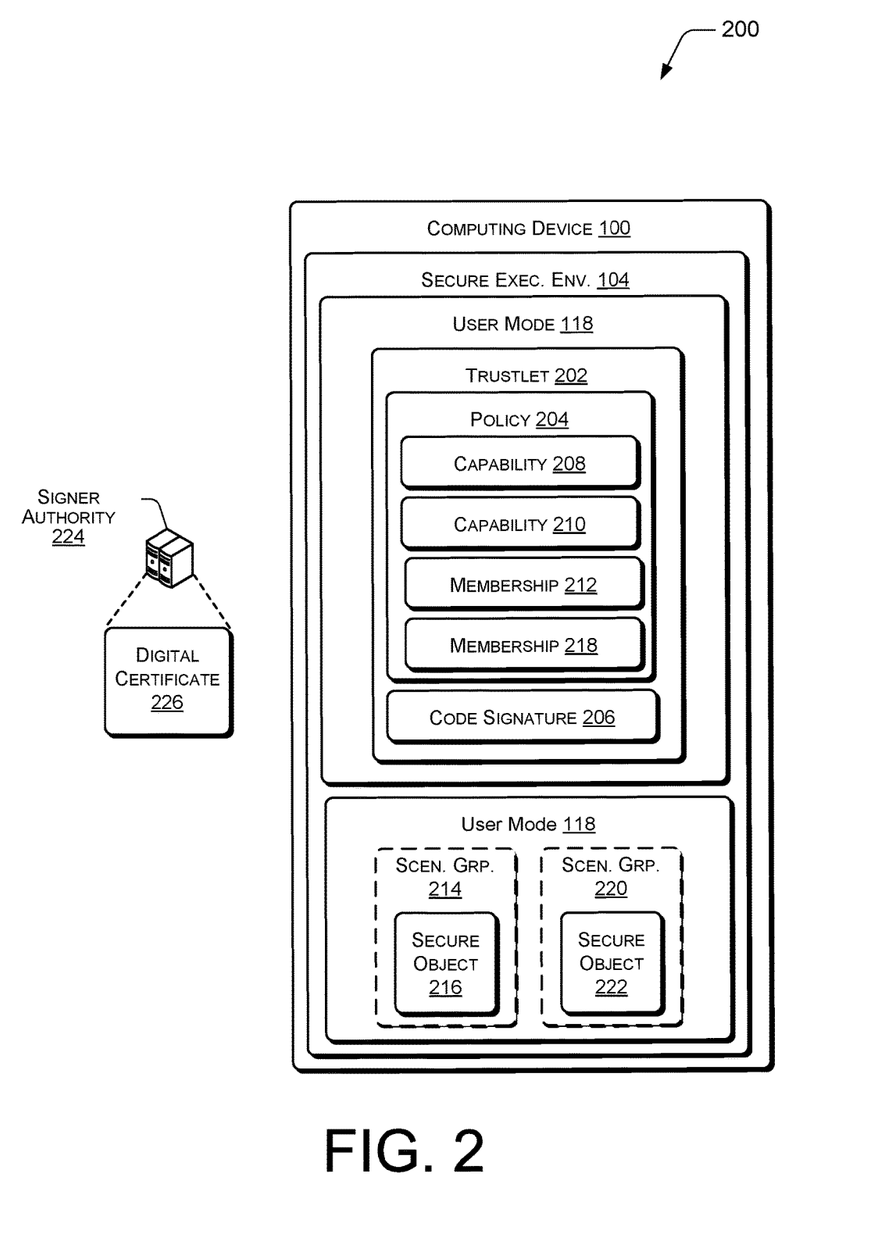
FIG. 2 is a block diagram depicting an environment for implementing a self-described security model for sharing secure resources between secure applications, according to various examples.

FIG. 2 depicts an environment including a computing device 200 for implementing a self-described security model for sharing secure resources between secure applications, according to various examples. As shown in FIG. 2, a trustlet D 202 can execute in the secure user mode 118 of the secure execution environment 104. Further, the trustlet D 202 can include a policy 204 and a code signature 206. For instance, the application code of trustlet D 202 can include the policy 204 within a resource section of the application code.

The policy 204 can indicate a capability 208 and a capability 210 of the trustlet D 202. As used herein, secure capabilities can define privileges of a trustlet to manipulate various aspects of the computing device 100. For instance, the capability 208 may constitute a secure section capability, which provides the ability to create/allocate a secure memory section via the proxy kernel 122, of secure execution environment 104. Further, the capability 210 may constitute a Direct Memory Access ("DMA") control capability, which provides the ability to utilize the DMA Application Program Interface ("API") for DMA operations. In some examples, the DMA control capability can be provided to trustlets having a driver functionality. Further, permission to grant particular secure capabilities can be restricted to a signer authority corresponding to a vendor of the secure execution environment 104.

Additionally, the policy 204 can indicate a membership 212 in a scenario group 214 associated with a secure object 216, and a membership 218 in a scenario group 220 associated with a secure object 222. As used herein, a scenario group includes one or more trustlets associated with a scenario. Further, as used herein, a scenario can include a workflow, an intended outcome and/or goal, series of processing steps, and/or category of computing processes.

For example, a scenario group can be organized to include one or more trustlets capable of working together to authenticate a user of a device based at least in part on biometric information (e.g., fingerprint, facial recognition, retina scan, iris scan, voice input, etc.). As another example, a scenario group can be organized to include one or more trustlets capable of generating and processing image data. As yet another example, a scenario group can be organized to include one or more trustlets associated with digital rights management. Further, the trustlets can interact to encode, encrypt, watermark, and control access to protected content.

A signer authority 224 determines the capabilities 208 and 212 granted to the trustlet 202, and the memberships 212 and 218 granted to the trustlet 202. Thus, the signer authority 224 is able to determine system level actions (e.g., creation of a secure section, DMA operations, etc.) that the trustlet 202 can perform, determine actions the trustlet 202 can perform with regard to the scenario groups 214 and 220 associated with the signer authority 224, and/or determine actions the trustlet 202 can perform with regard to the resources assigned to the scenario groups 214 and 220 associated with the signer authority 224.

In some instances, a capability granted to a trustlet can be specific to one or more memberships of the trustlet. For example, the capability 208 can be granted to the trustlet 202 specifically with regard to scenario group 214, and not provided with regard to scenario group 220. In some other instances, the capability 208 can be granted to the trustlet 202 with regard to all scenario groups to which the trustlet 202 is a member. For example, the capability 208 can be granted to the trustlet 202 with regard to scenario groups 214 and 220 based on memberships 212 and 218. In yet still some other instances, the capability 208 can be granted to the trustlet 202 with regard to system level functionality of computing device 100.

As illustrated in FIG. 2, the trustlet 202 can include a code signature 206. Upon approving the memberships 212 and 218 and capabilities 208 and 210 of the trustlet, the signer authority 220 can sign code of trustlet 202 to generate the code signature 206. For instance, the signer authority 220 can sign the code of trustlet 202 to generate the code signature 206 based at least in part on a digital certificate 228. As well known in the pertinent art, the digital certificate 228 can uniquely identify the signer authority within the secure execution environment 104.

In some instances, a vendor of the secure execution environment 104 can provide the digital certificate 226 to the signer authority 224 specifically for signing trustlets for execution in the secure execution environment 104. In some other instances, the digital certificate 226 can be a Public Key Infrastructure digital certificate. Further, the code signature 206 can ensure the integrity and authenticity of the trustlet 202. In some examples, the signer authority 226 can generate a hash of the code of the trustlet 202 and encrypt the hash with an encryption key associated with the digital certificate 226.

In some examples, the signer authority 224 can be a vendor of one or more trustlets. In some other examples, the signer authority 224 can be the vendor of the normal execution environment 102 and/or the secure execution environment 104.

Figure 3:
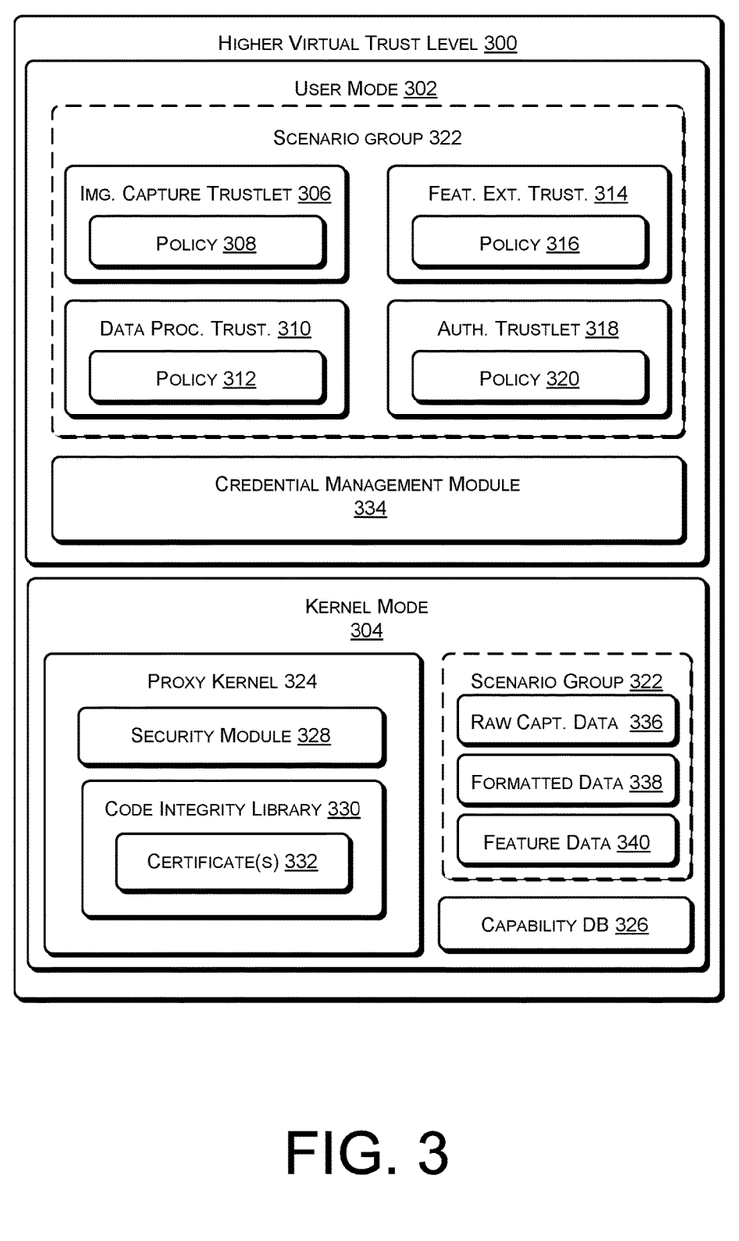
FIG. 3 is a block diagram depicting a higher virtual trust level that implements a self-described security model, according to various examples.

FIG. 3 depicts architecture 300 for a higher virtual trust level that implements a self-described security model, according to various examples. In some examples, the various devices and/or components of the higher virtual trust level 300 can include a user mode 302 and a kernel mode 304.

As shown in FIG. 3, the user mode 302 can execute an image capture trustlet 306 with a policy 308, a raw data processing trustlet 310 with a policy 312, a feature extraction trustlet 314 with a policy 316, and an authentication trustlet 318 with a policy 320. Further, the image capture trustlet 306, the raw data processing trustlet 310, the feature extraction trustlet 314, and the authentication trustlet 318 can belong to a scenario group 322.

The kernel mode 304 can execute a proxy kernel 324, and manage a capability database 326. The proxy kernel 324 can provide one or more kernel services to secure applications executing in the user mode 302. For example, the proxy kernel 324 can handle system calls received from the image capture trustlet 306, the raw data processing trustlet 310, the feature extraction trustlet 314, and/or the authentication trustlet 318. Further, the proxy kernel 324 can satisfy a service request associated with the system call via kernel logic native to the proxy kernel 324, or forward the request to kernel services of a lower virtual trust level.

Further, the proxy kernel 324 can include a security module 328 and a code integrity library 330. The security module 328 can perform encryption/decryption and cryptographic verification of memory pages associated with the higher virtual trust level 300. In some examples, the security module 328 can utilize a trusted platform module (TPM) to securely perform the encryption, hashing, and validation of memory pages.

The code integrity library 330 can evaluate the integrity and authenticity of a trustlet. For instance, the code integrity library can use a digital certificate 332 (e.g., trusted root certificate) to determine whether a code signature of the image capture trustlet 306 corresponds to the code of the image capture trustlet 306. Additionally, the code integrity library can use the digital certificate 332 to determine whether the image capture trustlet 306 has been signed by an authorized signer authority.

The capability database 326 can define capabilities within the higher virtual trust level 300. For example, the capability database 326 can store capability information for individual signer authorities. Further, the capability database 326 can identify the individual signer authorities within the capability database 326 by their respective public keys. For instance, the capability database 326 can define that a signer authority is permitted to grant a capability to utilize the DMA API. Additionally, the capability database 326 can identify applications permitted to create scenario groups.

In addition, the user mode 302 can execute a credential management module 334 that manages user credentials (e.g., user names, passwords, secrets, tokens, etc.) and user authentication. In a Windows™ environment, the credential management module 334 can include a Local Security Authority. Further, the Local Security Authority of the security module 328 can communicate with another Local Security Authority included in a lower virtual trust level.

Additionally, the kernel mode 304 can manage raw capture data 336, formatted data 338, and feature data 340. As illustrated in FIG. 3, the raw capture data 336, the formatted data 338, and the feature data 340 can belong to the scenario group 322. The scenario group 322 can be directed to a workflow for authenticating a user of a computing device based on biometric data.

For instance, the image capture trustlet 306 can include instructions for requesting creation of a secure memory section for the raw capture data 336 in accordance with policy 308, capturing image data via a camera device, and storing the image data to the raw capture data 336 in accordance with the policy 308.

In various examples, trustlets can access data from a first location and save the results of a transformation in a second location. For example, the data processing trustlet 310 can include instructions for requesting creation of a secure memory section for the formatted data 338 in accordance with the policy 312, requesting access to the raw capture data 336 in accordance with the policy 312, formatting the raw capture data 336 for further processing by other trustlets within the scenario group, and storing the formatted raw capture data 336 to the formatted data 338 in accordance with the policy 312. In some examples, the data is stored in one location and trustlets can act on the data in the location. For example, the data processing trustlet 310 can include instructions for requesting opening or access of a secure memory section for the formatted data 338 in accordance with the policy 312, requesting access to the raw capture data 336 in accordance with the policy 312, formatting the raw capture data 336 for further processing by other trustlets within the scenario group, and storing the formatted raw capture data 336 to the formatted data 338 in accordance with the policy 312.

The feature extraction trustlet 314 can include instructions for requesting creation and/or opening/access of a secure memory section for the feature data 340 in accordance with the policy 316, requesting access to the formatted data 340 in accordance with the policy 316, selecting a plurality of data points from the formatted data 338, and storing the selected data points to the feature data 340 in accordance with the policy 316.

The authentication trustlet 318 can include instructions for requesting access to the feature data 340 in accordance with the policy 320, comparing the feature data 340 to pre-existing feature, and determining an identity of the user based at least in part on the comparison.

Figure 4:
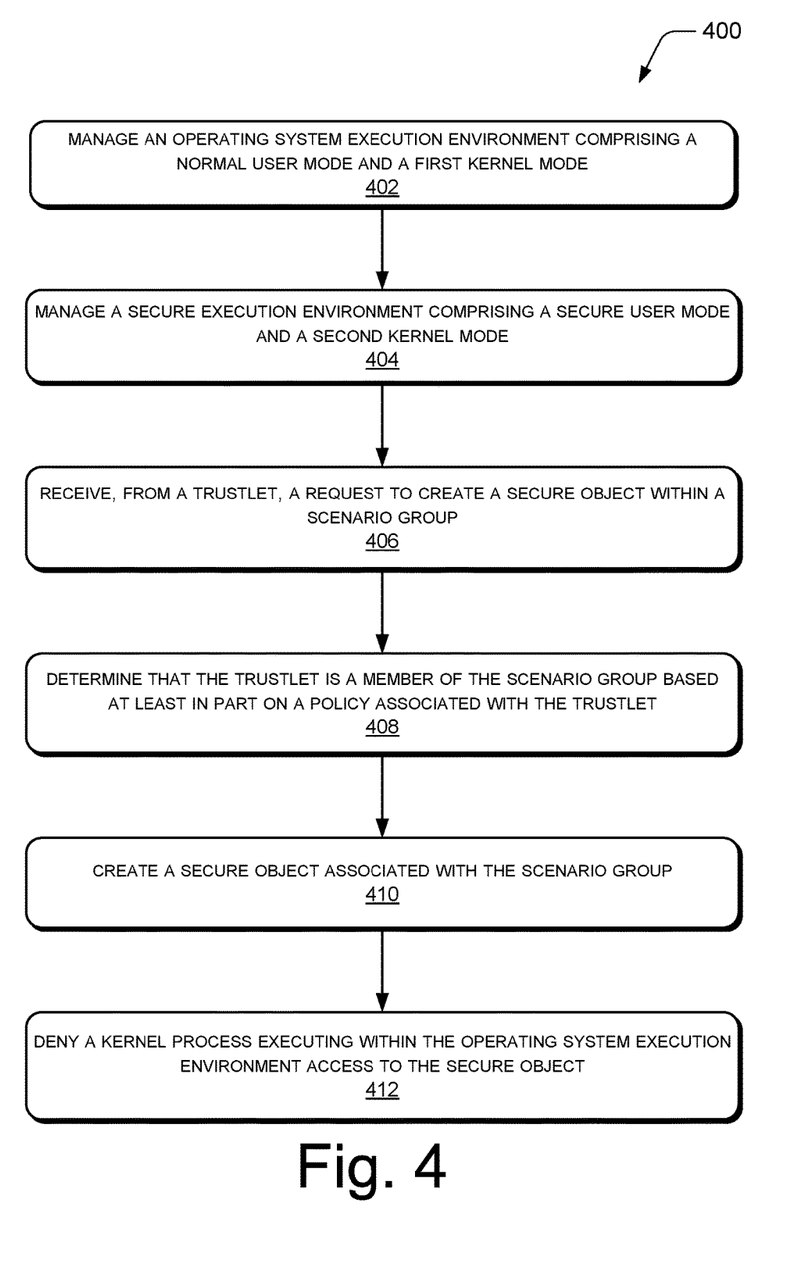
FIG. 4 is a flow diagram illustrating a process for creating a secure object within a scenario group in a self-described security model, according to some examples.

FIG. 4 is a flow diagram 400 for creating a secure object within a scenario group in a self-described security model according to some examples.

At block 402, a proxy kernel can manage an operating system execution environment comprising a normal user mode and a first kernel mode. For example, the proxy kernel 122 can manage the operating system execution environment 102 (i.e., normal execution environment) comprising the normal user mode 108 and the kernel mode 110.

At block 404, a proxy kernel can manage a secure execution environment comprising a secure user mode and a second kernel mode. For instance, the proxy kernel 122 can manage the secure execution environment 104 comprising the secure user mode 118 and the kernel mode 120.

At block 406, a proxy kernel can receive, from a trustlet, a request to create a secure object within a scenario group. For example, in a Windows™ environment, the proxy kernel 324 can receive an IumCreateSecureSection system call from an isolated user mode application, such as the image capture trustlet 306. Further, the IumCreateSecureSection system call parameters can include an identifier of the secure object 336 and an identifier of the scenario group 322. Additionally, the proxy kernel 324 can perform a lookup to determine whether the identifier of the secure object 336 is unique within a namespace. In some instances, the namespace can correspond to all secure objects associated with the scenario group 322 and/or a corresponding signer authority. In some other instances, the namespace can correspond to all secure objects within the secure execution environment 300. Thus, the namespace can constitute a single global namespace, and the identifier of the secure object would constitute a globally unique identifier.

In some examples, a secure memory section can only be accessed using a secure memory section API and a handle that represents the secure object. Therefore, the IumCreateSecureSection system call can provide a handle to the image capture trustlet 306. Further, the image capture trustlet 306 can close the handle when the image capture trustlet 306 has completed its use of the secure object 336. In some instances, when all the handles representing the secure object 336 have been closed, the proxy kernel 324 can delete the contents of the secure object 336.

At block 408, the proxy kernel can determine that the trustlet is a member of the scenario group based at least in part on a policy associated with the trustlet. For example, the proxy kernel 324 can determine that the policy 308 of the image capture trustlet 306 indicates that the trustlet is a member of the scenario group 322.

Additionally, the proxy kernel 324 can verify that a code signature of the image capture trustlet 306 is associated with the signer authority that manages the scenario group 322. For instance, the proxy kernel 324 can use a public key certificate 332 of the signer authority to verify that the signer authority generated the code signature. In another instance, the proxy kernel 324 can use a symmetric key shared with the signer authority to verify that the signer authority generated the code signature.

At block 410, the proxy kernel can create a secure object associated with the scenario group. For example, the proxy kernel 324 can create a secure memory section (i.e., raw capture data 336) within the scenario group 322. Further, the proxy kernel 324 can permit the image capture trustlet 306 to write data to the secure memory section (i.e., raw capture data 336). In some examples, the secure memory section (i.e., raw capture data 336) can include non-paged memory belonging to a system space of a virtual address space. Additionally, the proxy kernel can notify a trustlet agent executing in the operating system execution environment (i.e., a normal execution environment) of creation of the secure object. For example, the proxy kernel 324 can send a message to the trustlet agent indicating that the secure object (i.e., raw capture data 336) has been created. In another example, the image capture trustlet 306 can send a message to the trustlet agent, such as trustlet agent 140, indicating that the secure object (i.e., raw capture data 336) has been created.

At block 412, the proxy kernel can deny a kernel mode driver executing within the operating system execution environment access to the secure object. In examples, the proxy kernel 324 can modify memory access protections associated with the secure memory section (i.e., raw capture data 336) to disable access by components dynamically loaded into the kernel mode 110 (e.g., kernel mode drivers, kernel extensions, kernel services, etc.) For example, the proxy kernel 324 can modify memory access protections associated with the secure memory section (i.e., raw capture data 336) to disable access by a lower virtual trust level to the secure memory section (i.e., raw capture data 336). Further, the proxy kernel 324 and/or its associated kernel service can implement authorization techniques to enforce the modified memory access protections.

Figure 5:
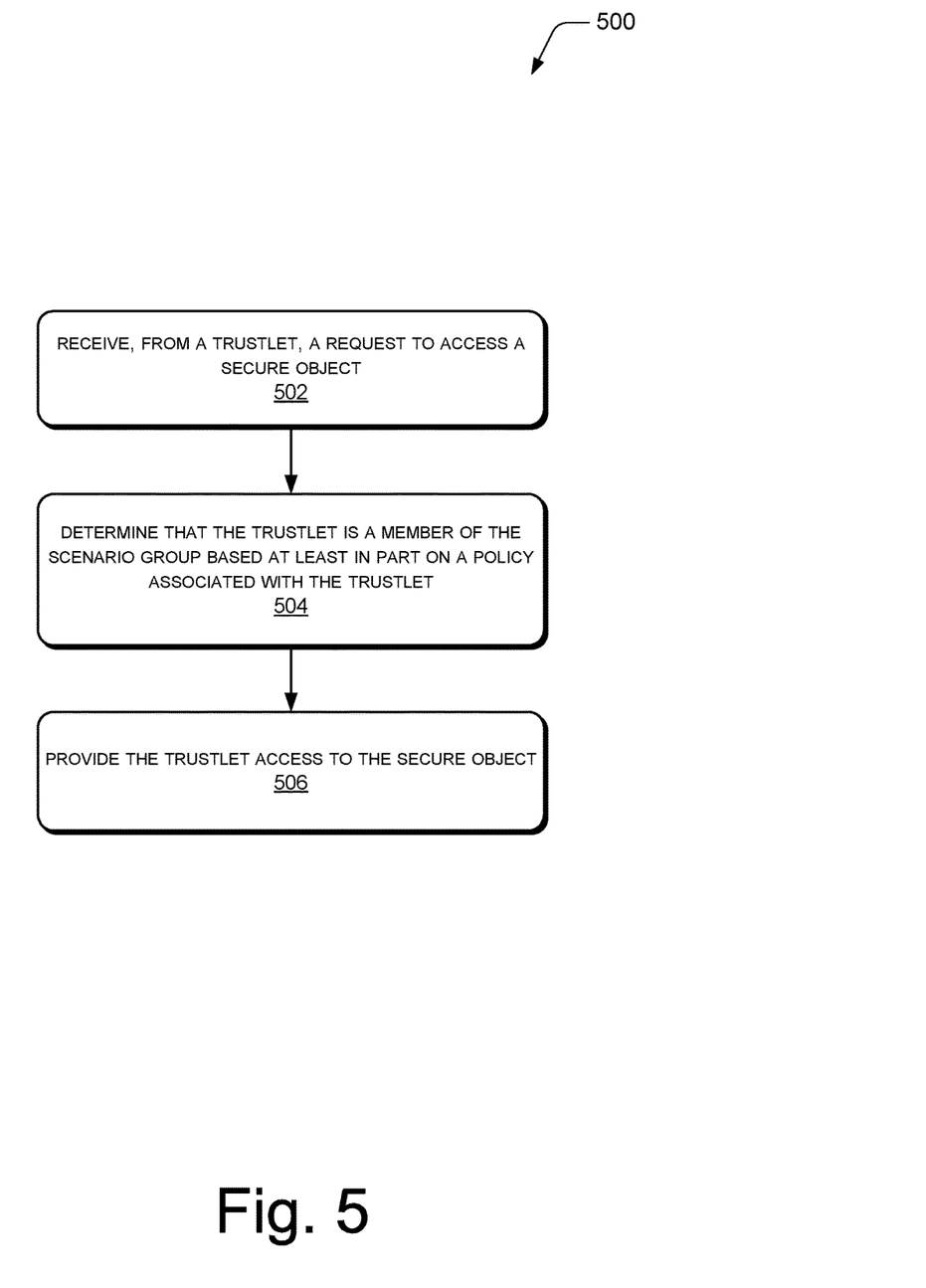
FIG. 5 is a flow diagram illustrating a process for opening a secure object within a scenario group in a self-described security model, according to some examples.

FIG. 5 is a flow diagram 500 for opening a secure object within a scenario group in a self-described security model according to some examples.

At block 502, a proxy kernel can receive, from a trustlet, a request to access a secure object. For example, in a Windows™ environment, the proxy kernel 324 can receive an IumOpenSecureSection system call from an isolated user mode application, such as the data processing trustlet 310. Further, the IumOpenSecureSection system call parameters can include an identifier of the secure object (i.e., raw capture data 336) and an identifier of the scenario group 322.

In some examples, a secure memory section can only be accessed using a secure memory section API and a handle that represents the secure memory section. Therefore, the identifier of the secure object (i.e., raw capture data 336) can include a handle representing the secure memory section (i.e., raw capture data 336), or a pointer to the handle. Further, the trustlet 310 can close the handle when the trustlet 310 has completed its use of the secure memory section 216 (i.e., raw capture data 336).

At block 504, the proxy kernel can determine that the trustlet is a member of the scenario group based at least in part on a policy associated with the trustlet. For example, the proxy kernel 324 can determine that the policy 312 indicates that the data processing trustlet 310 is a member of the scenario group 322. In some instances, the proxy kernel 324 can match the identifier of the scenario group 322 provided with the IumOpenSecureSection system call to the memberships defined in the policy 312. As such, the trustlet is protected from opening a secure object created by an untrusted source, and the secure object is protected from trustlets that do not belong to the scenario group associated with the secure object.

Additionally, the proxy kernel 324 can verify that the code signature of the data processing trustlet 310 is associated with the signer authority that manages the scenario group 322. For instance, the proxy kernel 324 can use a public key certificate 332 of the signer authority to verify that the signer authority generated the code signature. In another instance, the proxy kernel 324 can use a private key of the signer authority to verify that the signer authority generated the code signature.

At block 506, the proxy kernel can provide the trustlet access to the secure object. For example, the proxy kernel 324 can modify memory access protections associated with the secure memory section (i.e., raw capture data 336) to enable access by the data processing trustlet 310 to the secure memory section (i.e., raw capture data 336). In particular, the proxy kernel 324 can permit the data processing trustlet 310 to read data from the secure memory section (i.e., raw capture data 336). In some examples, the secure memory section can be mapped to non-paged memory.

Figure 6:
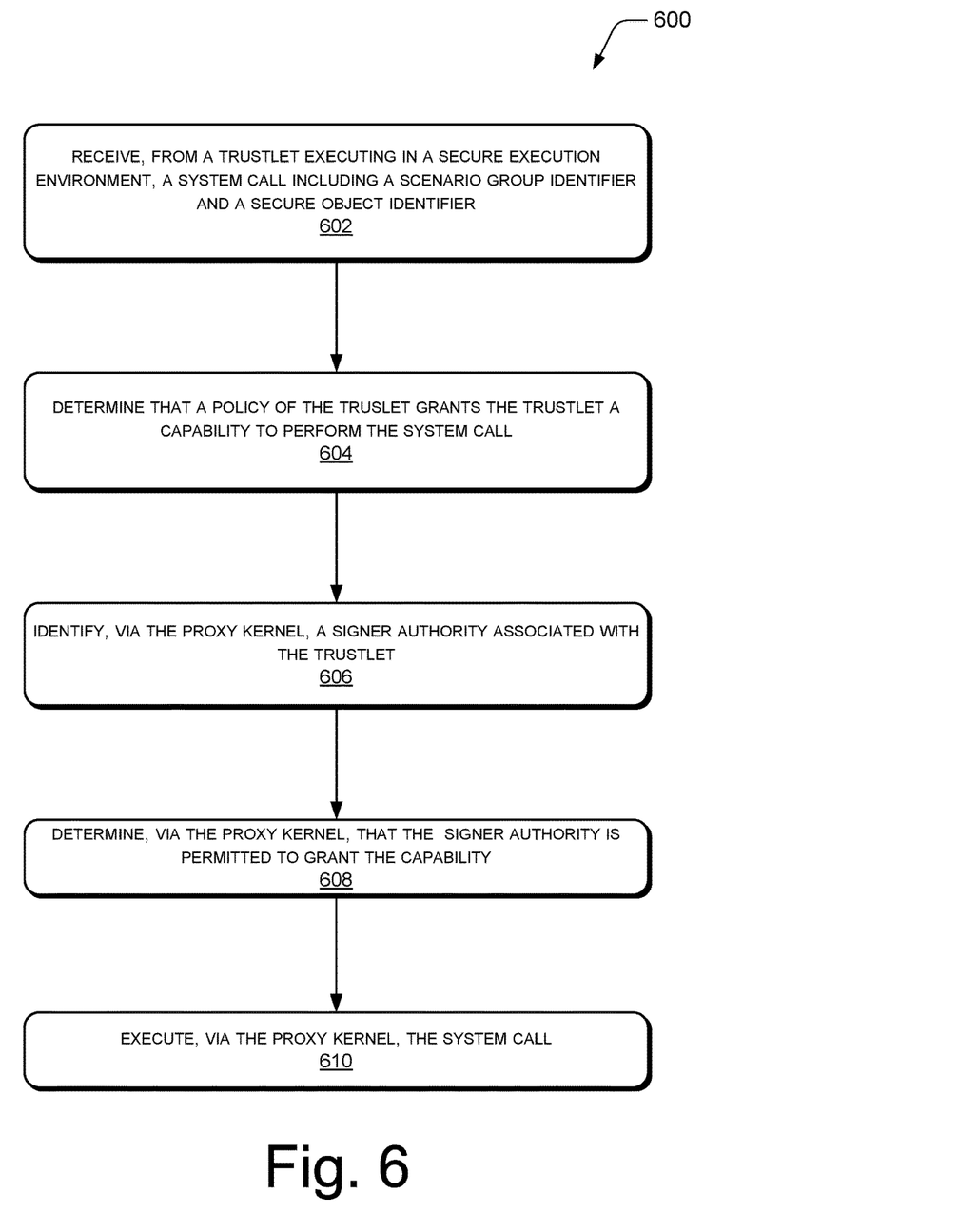
FIG. 6 is a flow diagram illustrating a process for servicing a system call in a self-described security model, according to some examples.

FIG. 6 is a flow diagram 600 of a process for servicing a system call in a self-described security model.

At block 602, a proxy kernel can receive, from a trustlet executing in a secure execution environment, a system call including a scenario group identifier and a secure object identifier. For example, in a Windows™ environment, the proxy kernel 122 can receive an IumCreateSecureSection system call from the trustlet 202. Further, the IumCreateSecureSection system call can include parameters identifying a secure object 216 (e.g., an object identifier) and an identifier of the scenario group 214.

At block 604, a proxy kernel can determine that a policy of the trustlet grants the trustlet a permission to perform the system call. For example, the proxy kernel 122 can determine that the policy 204 indicates that the trustlet 202 is a member of the scenario group 214. Additionally, the proxy kernel can 122 determine that the policy 204 indicates that the trustlet 202 is granted a Secure Section capability, which provides the ability to create/allocate a secure memory section via the proxy kernel.

At block 606, the proxy kernel can identify a signer authority associated with the trustlet. For example, the proxy kernel 122 can determine the signer authority 224 that signed the trustlet 202 based at least in part on the code signature 206.

At block 608, the kernel service can determine, via the proxy kernel, that the signer authority is permitted to grant the capability. For example, the proxy kernel 122 can determine that the signer authority 224 is permitted to grant the Secure Section capability 208 based at least in part on a capability database, such as the capability database 326.

At block 610, the kernel service can execute, via the proxy kernel, the system call. For example, the proxy kernel 122 can execute the IumCreateSecureSection system call. Thus, creating the secure memory section 216 within the scenario group 214. Further, the proxy kernel 122 can permit the trustlet 202 to write data to the secure memory section 216.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 7:
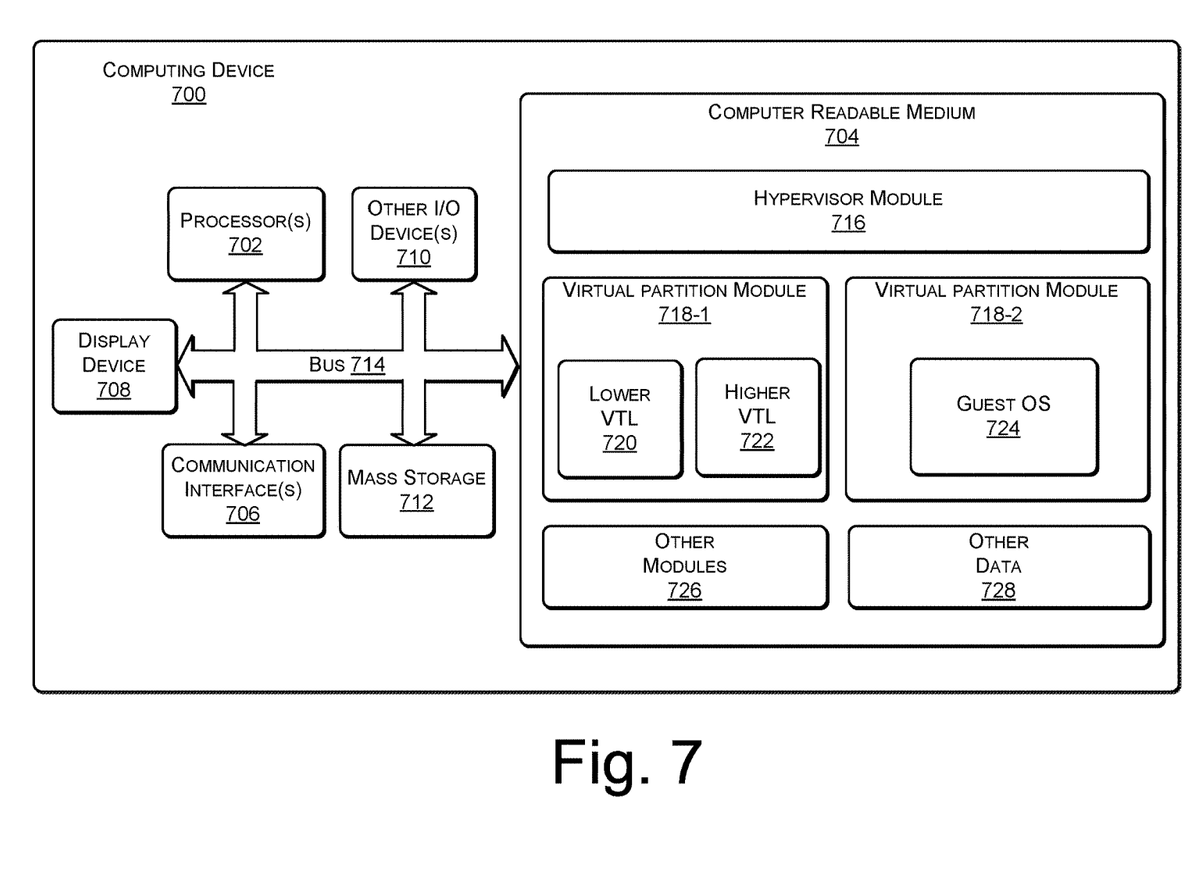
FIG. 7 is a block diagram of a computing device according to some examples.

FIG. 7 illustrates an example configuration of a computing device 700 that can be used to implement the modules and functions described herein. For example, the computing device 700 can represent the computing device 100.

The computing device 700 can include at least one processor 702, computer-readable media 704, communication interface(s) 706, a display device 708, other input/output (I/O) devices 710, and one or more mass storage devices 712, able to communicate with each other, such as via a system bus 714 or other suitable connection.

The processor 702 can be a single processing unit or a number of processing units, all of which can include single or multiple computing units or multiple cores. The processor 702 can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. Among other capabilities, the processor 702 can be configured to fetch and execute computer-readable instructions stored in the computer-readable media 704, mass storage devices 712, or other computer-readable media.

Computer-readable media 704 can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast, communication media can embody computer readable instructions, data structures, program modules, or other data in a modulated data signal, such as a carrier wave, or other transmission mechanism. As defined herein, computer storage media does not include communication media.

Although illustrated in FIG. 7 as being stored in computer-readable media 704 of computing device 700, the modules 716, 718, and 720, or portions thereof, can be implemented using any form of computer-readable media that is accessible by computing device 700. Functionality associated with blocks 716, 718, and 720 can be combined to be performed by a fewer number of modules or it can be split and performed by a larger number of modules.

Computer-readable media 704 can include modules and components for implementing a self-described security model for sharing secure resources between applications according to the examples described herein. The computer-readable media 704 can include multiple modules to perform various functions, such as a hypervisor module 716, one or more virtual partition modules, such as 718-1 and 718-2. The hypervisor module 716 can be used to manage one or more virtual partitions, such as the virtual partitions 718-1 or 718-2. The hypervisor module 716 can include a "bare metal" hypervisor that runs on the computing device 200 without an intervening OS, and in effect includes its own minimal OS. In some examples, the hypervisor 202 can manage the virtual partition modules 718-1 and 718-2.

The virtual partition modules 718-1 and 718-2 can include individual virtual operating platforms (e.g., a virtual machine (VM)) created by the hypervisor 716. In some instances, a virtual operating platform can include a virtual view of a processor and a virtual memory address region that is private to a virtual partition module, such as 718-1 or 718-2.

Virtual partition module 718-1 can include a lower virtual trust level 720, such as lower virtual trust level 102, and a higher virtual trust level 722, such as higher virtual trust level 104. Further, one or more methods of inter-process communication, such as message passing, synchronization, shared memory pages, and remote procedure calls (RPC), can be used for communication between the lower virtual trust level 720 and the higher virtual trust level 722.

In addition, the virtual partition module 718-2 can include a guest OS 724. The hypervisor 716 can provide the guest OS 724 with guest physical addresses. Further, virtual processes, such as process A 112, executing within the virtual partition 718-2 can access the guest physical addresses through page tables controlled by the guest OS 724. Page tables typically record attributes (e.g., memory access protections) of the memory pages to which they relate, including specifying the extent to which the contents of the page can be accessed. Except as permitted by hypervisor 716, resources and activities outside the virtual partition module 718-2 are invisible to virtual processes within the virtual partition module 718-2.The computer-readable media 704 can also include other modules 726 that implement other features and other data 728 that includes intermediate calculations and the like.

The computing device 700 can also include one or more communication interface(s) 706 for exchanging data with other devices, such as via a network, direct connection, or the like, as discussed above. The communication interfaces 706 can facilitate communications within a wide variety of networks and protocol types, including wired networks (e.g., LAN, cable, etc.) and wireless networks (e.g., WLAN, cellular, satellite, etc.), the Internet and the like. Communication interfaces 706 can also provide communication with external storage (not shown), such as in a storage array, network attached storage, storage area network, or the like.

A display device 708, such as a monitor can be included in some examples for displaying information and images to users. Other I/O devices 710 can be devices that receive various inputs from a user and provide various outputs to the user, and can include a touch input device, a gesture input device, a camera, a keyboard, a remote controller, a mouse, a printer, audio input/output devices, and so forth.

EXAMPLE CLAUSES

A: A method, comprising: managing an operating system execution environment comprising a normal user mode and a first kernel mode; managing a secure execution environment comprising a secure user mode and a second kernel mode; receiving, from a first trustlet executing in the second user mode of the secure execution environment, a first request to create a secure object within a scenario group; determining that the first trustlet is a member of the scenario group; creating the secure object within the scenario group based at least in part on the first request; denying a process executing within the first kernel mode of the operating system execution environment access to the secure obj ect; receiving, from a second trustlet executing in the second user mode of the secure execution environment, a second request to access the secure object; determining that the second trustlet is a member of the scenario group;providing the second trustlet access to the secure object.

B: A method as paragraph A recites, further comprising: determining that a policy included in the first trustlet grants the first trustlet a capability to create a secure object; identifying a code signature associated with the first trustlet; determining that a signer authority associated with the code signature is permitted to provide the capability to create a secure object; and wherein the creating is further based at least in part on the determining that the signer authority associated with the code signature is permitted to provide the capability.

C: A method as paragraph A or B recites, further comprising: determining that a policy included in the second trustlet grants the second trustlet a capability to open a secure object; identifying a code signature associated with the second trustlet; determining that a signer authority associated with the code signature is permitted to provide the capability to open the secure object; and wherein the creating is further based at least in part on the determining that the signer authority associated with the code signature is permitted to provide the capability.

D: A method as paragraph A-C recites, further comprising: notifying a trustlet agent executing in the operating system execution environment of the creation of the secure object.

E: A method as any of paragraphs A-D recites, further comprising: sending a notification from the trustlet agent to the second trustlet, the notification indicating creation of the secure object.

F: A method as any of paragraphs A-E recites, further comprising: receiving, from a third trustlet executing in the second user mode of the secure execution environment, a third request to access the secure object; determining that third trustlet is not a member of the scenario group; and denying the third trustlet access to the secure obj ect.

G: A method as any of paragraphs A-F recites, wherein receiving the first request, comprises: receiving a system call to create the secure object from the first trustlet, the system call including a first identifier of the secure object, and a second identifier of the scenario group.

H: A method as any of paragraphs A-G recites, wherein receiving the second request, comprises receiving a system call to access the secure object from the second trustlet, the system call including a first identifier of the secure object, and a second identifier of the scenario group.

I: A method as any of paragraphs A-H recites, wherein the denying a process executing within the first kernel mode access to the secure object, further comprises disabling access by the kernel service to the memory associated with the secure object.

J: A method as any of paragraphs A-I recites, wherein the secure object includes at least one of a decryption key, a secret, a semaphore, a secure memory obj ect, a mutex, an event, and/or a waitable timers.

K: A method as any of paragraphs A-I recites, wherein at least one of the first trustlet or second trustlet is associated with a biometric process.

L: A computer readable medium having computer-executable instructions thereon, the computer-executable instructions to configure a computer to perform a method as any of paragraphs A-K recites.

M: A device comprising: a computer-readable media having computer-executable instructions thereon to configure a computer to perform a method as any one of paragraphs A-K recites, the processing unit adapted to execute the instructions to perform the method as any of paragraphs A-H recites.

N: A system comprising means for performing a method as any of paragraphs A-H recites.

O: A system, comprising one or more processors; a memory; a kernel executing on the one or more processors in a first trust level; a proxy kernel executing on the one or more processors in a second trust level; one or more modules maintained on the memory and executed by the one or more processors to perform acts comprising: receiving, via the proxy kernel, from a trustlet executing in the second trust level, a system call including a scenario group identifier and a secure object identifier; determining, via the proxy kernel, that a policy of the trustlet grants the trustlet a capability to perform the system call; identifying, via the proxy kernel, a signer authority associated with the code signature of the trustlet; determining, via the proxy kernel, that the signer authority is permitted to grant the capability; and executing, via the proxy kernel, the system call.

P: A system as paragraph O recites further comprising a capability database that indicates one or more capabilities assignable by the signer authority; and wherein the determining, via the proxy kernel, that a signer authority associated with the code signature of the trustlet is permitted to grant the capability is based at least in part on the capability database Q: A system as paragraphs O or P recites, wherein the capability includes a privilege to create a secure memory section within the memory.

R: A system as any of paragraphs O-Q recites, wherein the acts further comprise disabling access by the kernel to a memory address associated with the secure memory section S: A system as any of paragraphs O-R recites, wherein the secure object identifier identifies at least one of an encryption key, a secret, a semaphore, a secure memory object, a mutex, an event, and/or a waitable timer.

T: A computer-readable medium having thereon computer-executable instructions, the computer-executable instructions upon execution configuring a computer to perform acts comprising: receiving, from a secure process, a request to create a secure object within a scenario group; determining that a policy associated with the secure process grants the secure process a capability to create a secure object; creating a secure object associated with the scenario group, the secure object stored in a memory address space;

and disabling access by a kernel executing in normal execution environment to the memory address space, wherein access to the memory address space is disabled by modifying memory access attributes of the memory address space.

U: A computer-readable medium as paragraph T recites, further comprising identifying a code signature associated with the first secure process; and determining that a signer authority associated with the code signature is permitted to provide the capability to create a secure object.

V: A computer-readable medium as any of paragraphs S-U recites, wherein the secure process represents a first secure process, the request represents a first request, the policy represents a first policy, and the acts further comprise: receiving, from a second secure process, a second request to access the secure object; determining that the second secure process is a member of the scenario group based at least in part on a second policy included in the second secure process; determining that the second policy grants the second secure process access to the secure object; and providing the second secure process access to the secure obj ect.

W: A computer-readable medium as any of paragraphs S-V recites, wherein the acts further comprise: identifying a code signature associated with the second secure process; and determining that a signer authority associated with the second code signature is permitted to provide the capability to access a secure object within the scenario group.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 101, 201, and/or 700 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof. Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method, comprising:
managing an operating system execution environment comprising a normal user mode and a first kernel mode;
managing a secure execution environment comprising a secure user mode and a second kernel mode;
receiving, from a first trustlet executing in the secure user mode of the secure execution environment, a first request to create a secure object within a scenario group, wherein the scenario group is managed by a signer authority;
determining that the first trustlet is a member of the scenario group;
creating the secure object within the scenario group based at least in part on the first request;
denying a process executing within the first kernel mode of the operating system execution environment access to the secure object;
receiving, from a second trustlet executing in the secure user mode of the secure execution environment, a second request to access the secure object;
determining that the second trustlet is a member of the scenario group;
providing the second trustlet access to the secure object;
identifying a code signature associated with the first trustlet;
determining that the signer authority associated with the code signature is permitted to provide a capability to create the secure object; and
wherein the creating is further based at least in part on the determining that the signer authority associated with the code signature is permitted to provide the capability.

2. A method as claim 1 recites, further comprising:
determining that a policy included in the first trustlet grants the first trustlet the capability.

3. A method as claim 1 recites, further comprising:
determining that a policy included in the second trustlet grants the second trustlet a second capability to open the secure object;
identifying a second code signature associated with the second trustlet;
determining that the signer authority associated with the second code signature is permitted to provide the second capability to open the secure object; and
wherein the creating is further based at least in part on the determining that the signer authority associated with the second code signature is permitted to provide the second capability.

4. A method as claim 1 recites, further comprising notifying a trustlet agent executing in the operating system execution environment of the creation of the secure object.

5. A method as claim 4 recites, further comprising sending a notification from the trustlet agent to the second trustlet, the notification indicating creation of the secure object.

6. A method as claim 1 recites, further comprising:
receiving, from a third trustlet executing in the secure user mode of the secure execution environment, a third request to access the secure object;
determining that the third trustlet is not a member of the scenario group; and
denying the third trustlet access to the secure object.

7. A method as claim 1 recites, wherein receiving the first request, comprises: receiving a system call to create the secure object from the first trustlet, the system call including a first identifier of the secure object, and a second identifier of the scenario group.

8. A method as claim 1 recites, wherein receiving the second request, comprises receiving a system call to access the secure object from the second trustlet, the system call including a first identifier of the secure object, and a second identifier of the scenario group.

9. A method as claim 1 recites, wherein the denying a process executing within the first kernel mode access to the secure object, further comprises disabling access by a kernel service to a memory associated with the secure object.

10. A method as claim 1 recites, wherein the secure object includes at least one of a decryption key, a secret, a semaphore, a secure memory object, a mutex, an event, and/or a waitable timers.

11. A method as claim 1 recites, wherein at least one of the first trustlet or second trustlet is associated with a biometric process.

12. A system, comprising:
one or more processors;
a memory;
a kernel executing on the one or more processors in a first trust level;
a proxy kernel executing on the one or more processors in a second trust level;
one or more modules maintained on the memory and executed by the one or more processors to perform acts comprising:
receiving, via the proxy kernel, from a trustlet executing in the second trust level, a system call including a scenario group identifier and a secure object identifier, wherein a scenario group corresponding to the scenario group identifier is managed by a signer authority;
determining, via the proxy kernel, that a policy of the trustlet grants the trustlet a capability to perform the system call, wherein the capability includes the capability to create a secure object;
identifying, via the proxy kernel, the signer authority as associated with a code signature of the trustlet;
determining, via the proxy kernel, that the signer authority is permitted to grant the capability; and
executing, via the proxy kernel, the system call at least to create the secure object based at least in part on the determining that the signer authority associated with the code signature is permitted to provide the capability to create the secure object.

13. A system as claim 12 recites, further comprising a capability database that indicates one or more capabilities assignable by the signer authority; and wherein the determining, via the proxy kernel, that the signer authority associated with the code signature of the trustlet is permitted to grant the capability is based at least in part on the capability database.

14. A system as claim 12 recites, wherein the capability includes a privilege to create a secure memory section within the memory.

15. A system as claim 14 recites, wherein the acts further comprise disabling access by the kernel to a memory address associated with the secure memory section.

16. A system as claim 12 recites, wherein the secure object identifier identifies at least one of an encryption key, a secret, a semaphore, a secure memory object, a mutex, an event, and/or a waitable timer.

17. One or more non-transitory computer-readable media storing computer-executable instructions that, when executed on one or more processors, configure a computer to perform acts comprising:
receiving, from a secure process, a request to create a secure object within a scenario group, wherein the scenario group is managed by a signer authority;
determining that a policy associated with the secure process grants the secure process a capability to create a secure object;
creating a secure object associated with the scenario group, the secure object stored in a memory address space;
disabling access by a kernel executing in normal execution environment to the memory address space, wherein access to the memory address space is disabled by modifying memory access attributes of the memory address space;
identifying a code signature associated with the secure process; and
determining that the signer authority associated with the code signature is permitted to provide the capability to create the secure object,
wherein the creating is further based at least in part on the determining that the signer authority associated with the code signature is permitted to provide the capability.

18. One or more non-transitory computer-readable media as claim 17 recites, wherein the secure process represents a first secure process, the request represents a first request, the policy represents a first policy, and the acts further comprise:
receiving, from a second secure process, a second request to access the secure object;
determining that the second secure process is a member of the scenario group based at least in part on a second policy included in the second secure process;
determining that the second policy grants the second secure process access to the secure object; and providing the second secure process access to the secure object.

19. One or more non-transitory computer-readable media as claim 18 recites, wherein the acts further comprise:
   identifying a second code signature associated with the second secure process; and
   determining that the signer authority associated with the second code signature is permitted to provide a second capability to access a secure object within the scenario group.

* * * * *